July 24, 1928.
H. WOLFF
CRANK SHAFT MECHANISM FOR THE SLAY OF LOOMS
Filed Jan. 26, 1927
1,678,238
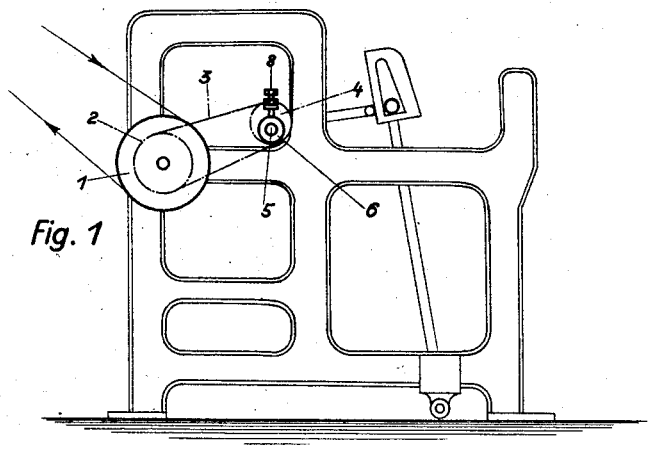
Fig. 1
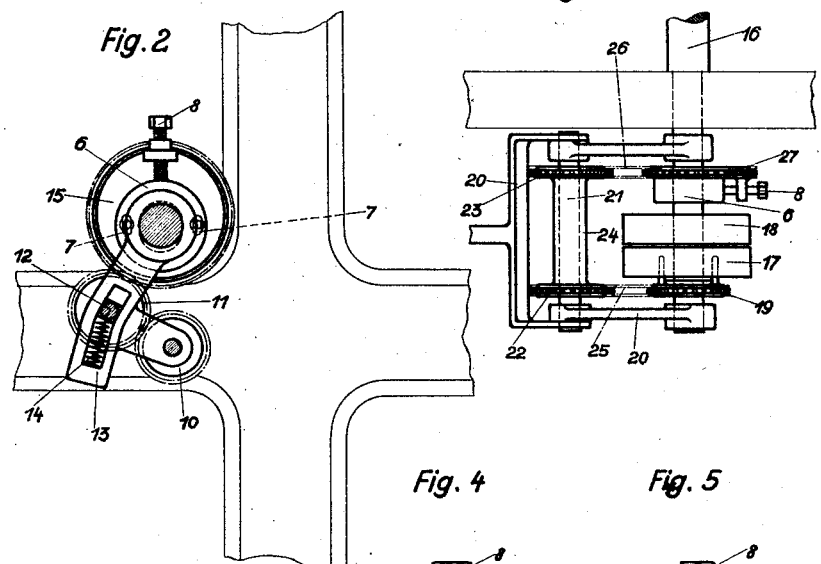
Fig. 2
Fig. 3
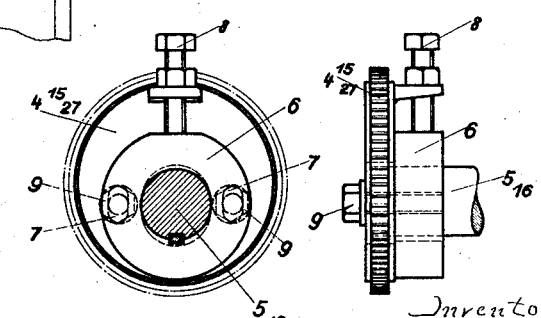
Fig. 4
Fig. 5
Inventor:
Herbert Wolff
by George C. Heinicke
Attorney.

Patented July 24, 1928.

1,678,238

UNITED STATES PATENT OFFICE.

HERBERT WOLFF, OF POLZIG, GERMANY, ASSIGNOR TO PROGRESS GESELLSCHAFT FÜR TEXTILMASCHINEN MIT BESCHRÄNKTER HAFTUNG, OF NUREMBERG, GERMANY, A CORPORATION OF GERMANY.

CRANK-SHAFT MECHANISM FOR THE SLAY OF LOOMS.

Application filed January 26, 1927, Serial No. 163,657, and in Germany August 14, 1926.

As is well known, the crank shaft for operating the slay in looms must at times turn with accelerated velocity to correspond to the movements of the slay.

It is the principal object of the invention to provide means for obtaining this accelerated motion of the crank shaft, according to which the temporary accelerated movement of rotation of the crank shaft is obtained by means of intermediate gearing from the normal driving mechanism.

Another object of the invention is the provision of an eccentric driving wheel the eccentricity of which can be adjusted in fixed connection with the crank shaft and formed as a toothed wheel or chain wheel, by which the conversion of the normal rotary motion into the temporarily accelerated movement of rotation is effected.

A further object of the invention is the provision of special driving mechanism to effect the transmission of the rotary motion to the eccentric driving wheel from a second shaft or in the case of individual drive of the crank shaft by means of toothed gearing with the addition of a resiliently or springily mounted intermediate wheel, or by chain wheel gearing, so carried in a special framework that the drive from belt pulleys mounted loosely on the crank shaft is transmitted through chain wheels or the eccentric wheel on the crank shaft.

These and other objects and advantages of my invention will become more fully known as the description thereof proceeds, and will then be specifically pointed out in the appended claims.

In the accompanying drawing, forming a material part of this disclosure:

Fig. 1 is an end elevation of a loom equipped with a crank shaft mechanism constructed according to my invention.

Fig. 2 is a fragmentary detail view of a modification of the driving mechanism on an enlarged scale.

Fig. 3 is a top plan view of another modified form of driving mechanism.

Fig. 4 is an elevation of the adjustable eccentric driving wheel.

Fig. 5 is a side view thereof.

In the constructional embodiment of the driving mechanism shown at Fig. 1 the drive is transmitted from the fast and loose pulley 1 by means of a chain wheel 2 and a chain 3 to the eccentrically mounted chain wheel 4. This latter is either fast upon the crank axle 5 or is adjustably connected to the sleeve 6, fast upon the shaft 5. The sleeve 6 and the chain wheel 4 are adjustably connected through the slot 7 in the chain wheel 4. The sleeve 6 and chain wheel 4 are interconnected by means of a screw 9 entering the slot 7. A variation of the eccentricity is avoided by the set screw 8 with lock nut.

In the constructional embodiment of the driving mechanism according to Fig. 2 an individual drive for the crank shaft is provided, and this is transmitted from the toothed wheel 10 to the intermediate wheel 11. This intermediate wheel 11 is mounted upon a spindle 12, which is carried in the fork shaped bearer arm 13 or in a slot therein in a resilient manner, the spindle 12 resting upon a spring 14. The intermediate wheel 11 is kept constantly pressed by the spring 14 against the eccentric toothed wheel 15, and as the arrangement of the intermediate wheel is at the corresponding angle with respect to the axles of the toothed wheels 11 and 15, the intermediate wheel 11 therefore follows the noncircular movement of the toothed wheel 15 and at the same time does not come out of engagement with the driving wheel 10. The adjustment of the eccentricity of the toothed wheel 15 in this constructional form is just the same as that already described.

In the constructional embodiment of the driving mechanism according to Fig. 3 there is mounted loosely on the crank shaft 16 both a fast and loose pulley 17, 18, one of these 17 is fixed with respect to the chain wheel 19 which is loose upon the shaft. An oscillating framework is provided on the crank shaft, suitably supported and carries the spindle 21 for the two intermediate chain wheels 22 and 23, which are together connected by a sleeve or collar 24. The chain wheel 22 is connected by the chain 25 with the chain wheel 19 on the crank shaft 16 and drives the parallel chain wheel 23 which in turn by means of the chain 26 drives the eccentric chain wheel 27. This again receives adjustable eccentricity and is fixedly connected through the sleeve 6 to the crank shaft. In this case again a temporary accelerated drive of the crank shaft as also an adjustment for the eccentricity of the chain wheel are rendered possible.

It is of importance in carrying out the invention to arrange the driving parts that they have no disturbing effect upon the general mechanism and this object is attained by the constructions described.

Having thus described my invention, what I claim as new and desire to secure as Letters Patent is:

1. In crank shaft driving mechanism for the slay of looms including its crank shaft, a construction including a toothed driving wheel, an eccentrically mounted toothed wheel in connection with the crank shaft for the slay and a resiliently mounted intermediate toothed wheel in engagement with both the first mentioned wheels, substantially as described.

2. In a crank-shaft driving mechanism for the slay of looms including its crank shaft, a toothed driving wheel, an eccentrically mounted toothed wheel in connection with the crank shaft, a resiliently mounted intermediate toothed wheel in engagement with both of the first mentioned wheels, a fork-member having slotted arms, a spindle carrying said intermediate wheel and sliding in the slotted arms of said fork-member, and springs between said spindle and the ends of the slots of said fork-member.

In testimony whereof I have affixed my signature.

HERBERT WOLFF.